Aug. 5, 1969  R. H. WEISNER  3,459,087
SHEAR GAGE
Filed Dec. 20, 1967  4 Sheets-Sheet 1
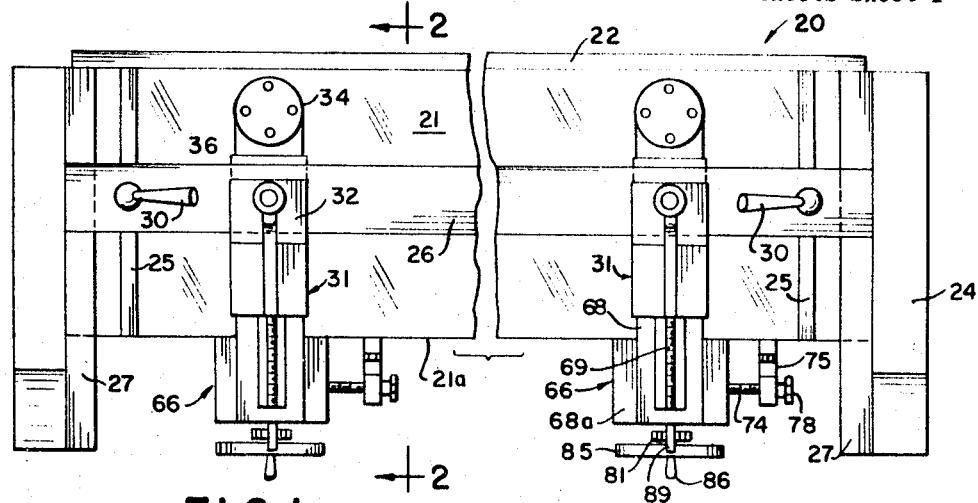
FIG.1.
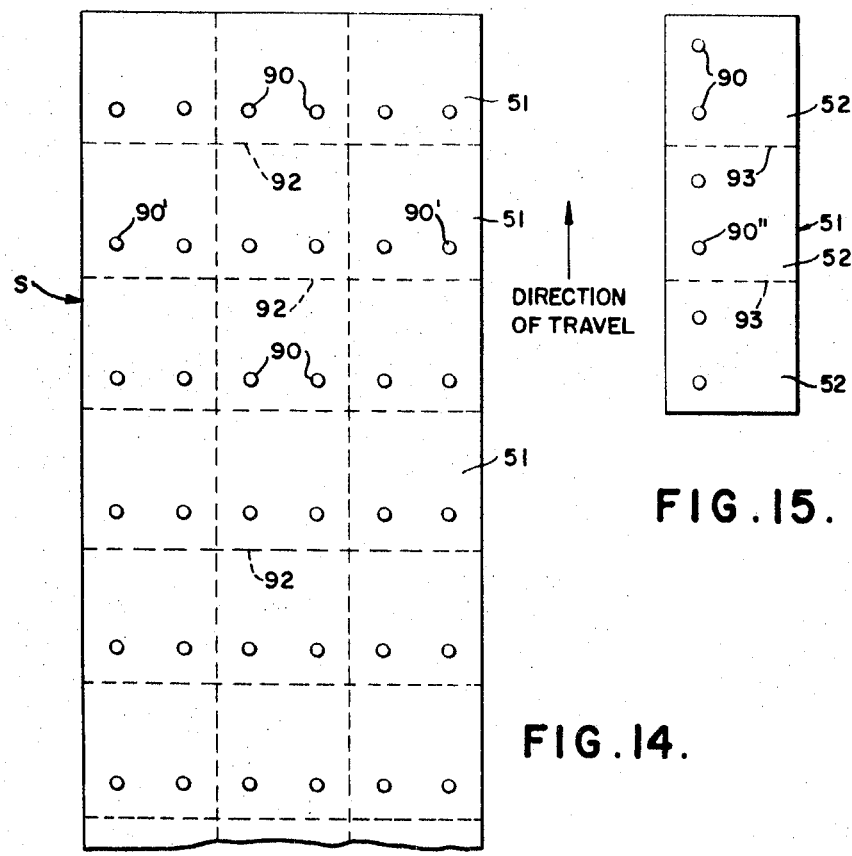
FIG.14.
FIG.15.
INVENTOR
Ralph H. Weisner
BY *Munson H. Lane*
ATTORNEY Aug. 5, 1969 R. H. WEISNER 3,459,087
SHEAR GAGE
Filed Dec. 20, 1967 4 Sheets-Sheet 2

INVENTOR
Ralph H. Weisner
BY *Munson H. Kane*
ATTORNEY

Aug. 5, 1969  R. H. WEISNER  3,459,087
SHEAR GAGE
Filed Dec. 20, 1967  4 Sheets-Sheet 3

INVENTOR
Ralph H. Weisner

BY Munson H. Kane
ATTORNEY

Aug. 5, 1969 R. H. WEISNER 3,459,087
SHEAR GAGE
Filed Dec. 20, 1967 4 Sheets-Sheet 4

INVENTOR
Ralph H. Weisner

BY *Munson H. Lane*
ATTORNEY

United States Patent Office 3,459,087
Patented Aug. 5, 1969

3,459,087
SHEAR GAGE
Ralph H. Weisner, Greensboro, N.C., assignor to Wysong & Miles Company, Greensboro, N.C.
Filed Dec. 20, 1967, Ser. No. 692,111
Int. Cl. B26d 7/02
U.S. Cl. 83—451                                       12 Claims

ABSTRACT OF THE DISCLOSURE

A gage for accurately positioning pre-punched stock on the bed of a shear with respect to the knife. The gage consists of a support bar mounted above the bed, carriers supported by the bar, and projectable and retractable gage pins depending from the carriers for passage through pre-punched holes in the stock into apertured gage blocks positioned on the bed. The support bar, carriers and gage blocks are adjustable transversely of the bed and toward and away from the knife to properly locate the gage blocks and pins.

---

This invention relates to new and useful improvements in shears, particularly those used for shearing sheets or strips of metal stock which has been pre-punched with locating holes, and the principal object of the invention is to facilitate shearing of such stock with considerable accuracy in terms of distance of the sheared edges from the locating holes.

This object is attained by the provision of a gage embodying projectable and retractable gage pins depending from carriers on a supporting bar above the shear bed and coacting with apertured gage blocks on the bed, the pins being projectable through the pre-punched stock into the apertured gage blocks for accurately locating the stock with respect to the shearing knife.

An important feature of the invention resides in the provision of coarse and fine adjustment means for properly locating the gage blocks and pins both transversely of the bed and toward and away from the knife as required, the coarse adjustment being quickly and easily made within an approximate range, while the fine adjustment permits high accuracy within close limits.

Another important feature of the invention resides in a universal mounting of the gage pins in their carriers to assure quick and proper alignment thereof with the pre-punched stock and with the apertured gage blocks even when the pins are not in exact register with the apertures in the blocks.

The gage apparatus of the invention is simple in construction, easily adjusted, highly accurate, and adapted for installation on shears of various conventional types without interfering with the handling of material to be sheared.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary top plan view of a shear embodying the gage of the invention;

FIG. 14 is a plan view of a pre-punched sheet of stock; and

FIG. 15 is a plan view of a strip sheared from the sheet of FIG. 14.

Figure 3:
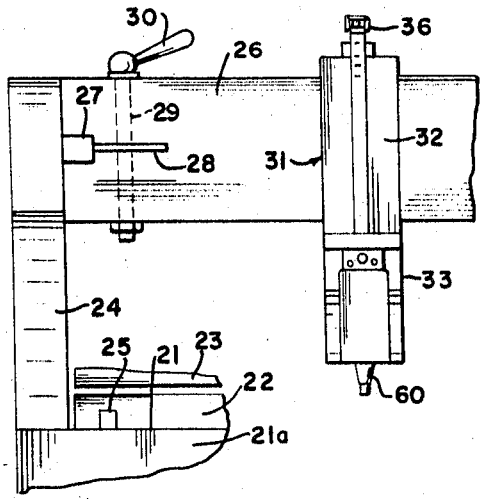
FIG. 3 is a fragmentary elevational view showing the mounting of the supporting bar at one side of the shear.

Referring now to the accompanying drawings in detail, the general reference numeral 20 designates a shear of any suitable conventional construction, the same including a bed 21 provided along its back edge with a shearing knife including a stationary blade 22 and a cooperating movable blade 23 in accordance with conventional practice. (See FIG. 10.) Usually, the shear also includes a frame, side portions of which project above the bed 21 at the sides or ends of the bed, as indicated at 24, these frame portions serving to support overhead mechanism (not shown) for actuating the movable knife blade 23, and the like. Also, suitable side gaging bars 24 are secured to the bed 21 adjacent the frame portions 24, as will be apparent from FIGS. 1 and 3.

The gage of the invention involves the provision of a transverse supporting bar 26 which is disposed above the bed 21 in parallel to the knife 22, the ends of the bar being notched for sliding movement along a pair of mounting rails 27 extending horizontally on the inner surfaces of the frame portions 24 at right angles to the knife. The end portions of the bar 26 are also slotted at 28 (see FIG. 3) and clamping screws 29, equipped with suitable handles 30, extend vertically through the slotted end portions of the bar so that the latter may be clamped in an adjusted position on the rails 27. It will be understood that when the screws 29 are loosened, the bar 26 may be slid along the rails 27 in a direction toward or away from the knife 22.

Figure 4:
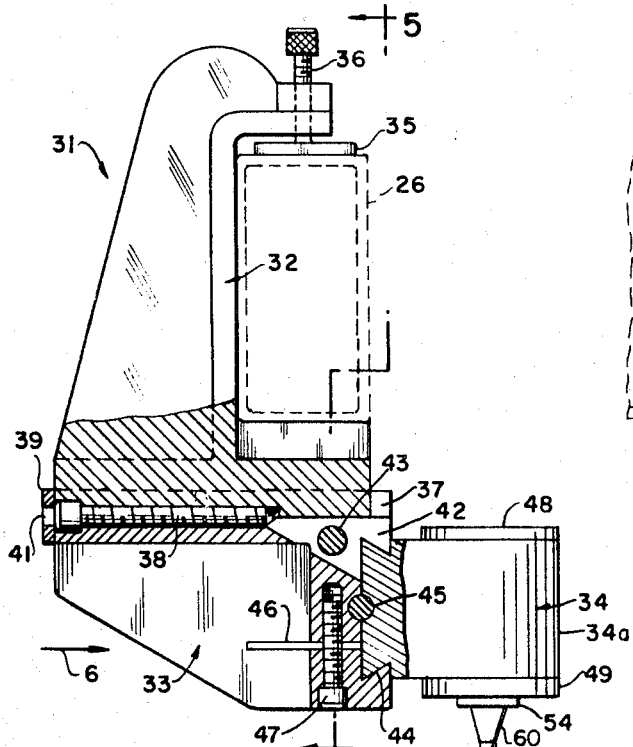
FIG. 4 is an enlarged vertical sectional view of one of the carriers.
Figure 5:
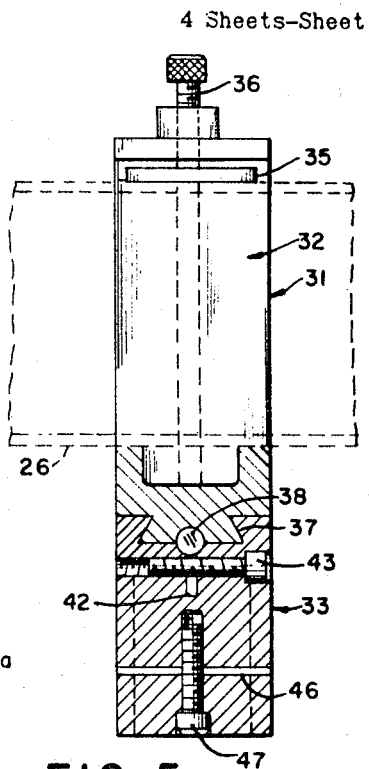
FIG. 5 is a vertical sectional view, taken substantially in the plane of the line 5—5 in FIG. 4.
Figure 6:
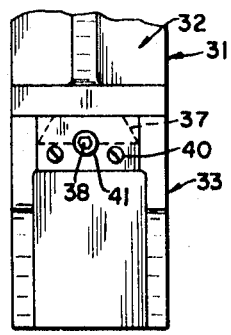
FIG. 6 is a fragmentary elevational view of the carrier, taken in the direction of the arrow 6 in FIG. 4.

A pair of carriers designated generally as 31 are adjustably and removably supported on the bar 26, and since these carriers are identical in construction, a description of one will suffice for both. As is best shown in FIGS. 4–6, each carrier 31 comprises an upper clamp portion 32, a lower slide portion 33 and a power cylinder portion 34. The clamp portion 32 accommodates the support bar 26 and includes a clamping plate 35, actuated by a screw 36, whereby the entire carrier 31 may be releasably locked in an adjusted position along the length of the bar 26.

The base of the clamp portion 32 is connected by a dovetail slide 37 to the lower slide portion 33 as is best shown in FIG. 5, the dovetail slide arrangement including an adjusting screw 38 whereby the portion 33 may be slid relative to the portion 32 in a direction toward and away from the knife 22. For this purpose the screw 38 operatively engages screw-threads provided in the portion 32 but is freely rotatable in the portion 33 which is unthreaded. Axial movement of the screw 38 relative to the portion 33 is prevented by a keeper plate 39 which is secured to the portion 33 by suitable screws 40 (see FIG. 6). The plate 39 overlies the head of the screw 38 and is formed with an opening 41 so that access by a wrench may be had for turning the screw, as will be apparent from FIG. 4. It is to be noted that the region of the slide portion 33 adjacent the dovetail slide 37 is slit as at 42 and that the slit is traversed by a locking screw 43 so that when the portion 33 has been slid to an adjusted position by the screw 38, it may be releasably locked in that position by tightening of the screw 43.

In a similar manner, the power cylinder portion 34 of the carrier is connected to the portion 33 by a dovetail slide 44 which extends in a direction transverse to the slide 37, that is, in parallel to the knife 22, the sliding of the portion 34 relative to the portion 33 being effected by an adjustment screw 45 which is arranged in a manner similar to the aforementioned screw 38. Also, the portion 34 is slit as at 46 so that it may be releasably locked by a locking screw 47 in an adujsted position relative to the portion 33.

Figure 8:
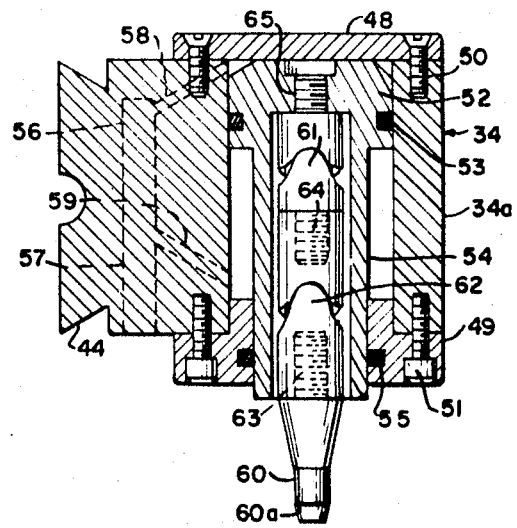
FIG. 8 is an enlarged vertical sectional view showing the mounting of the gage pin in the actuating cylinder.
Figure 7:
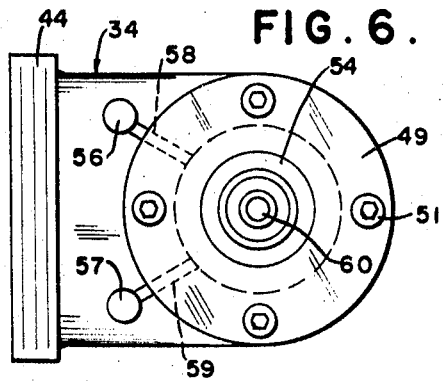
FIG. 7 is an underside plan view showing the cylinder portion of the carrier.
Figure 9:
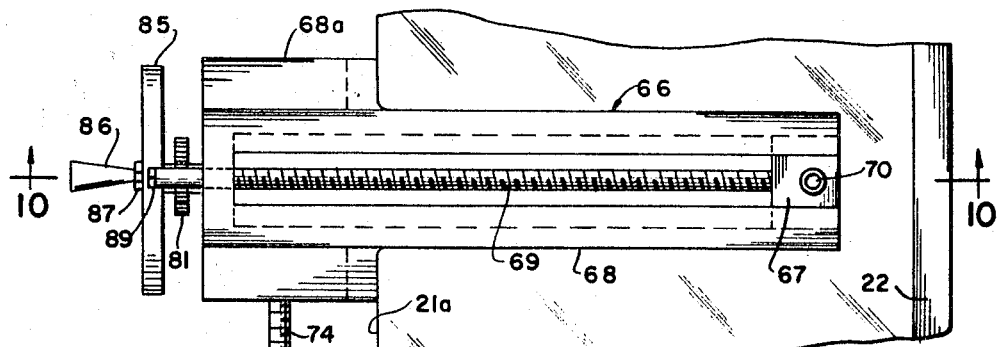
FIG. 9 is a fragmentary top plan view of the shear bed with one of the gage block holders thereon.

The cylinder portion 34 of the carrier 31 includes a double-acting fluid operator comprising a cylindrical housing 34a which is an integral component of the portion 34 and is equipped with end caps 48, 49 which are secured to the housing 34a by suitable screws 50, 51, respectively, as will be apparent from FIG. 8. The housing 34a has a vertical axis and contains a reciprocable piston 52 provided with a sealing ring 53. The piston is integral with a tubular piston rod or extension 54 which projects slidably through the cap 49 and is sealed by a ring 55 in that cap. The portion 34 is formed with fluid transmitting bores 56, 57 and passages 58, 59, respectively, communicating with the interior of the housing 34a respectively above and below the piston 52, so that reciprocation of the piston in the housing may be caused by appropriately directing flow of fluid through the bores and passages. Obviously, the fluid may be hydraulic fluid or compressed air, as desired.

The piston 52 is operatively connected to a gage pin 60 by a pair of universal joints 61, 62 of conventional construction, the pin 60 being screw-threaded into the joint 62 as at 63, the two joints being screw-threaded together as at 64, and the joint 61 being screw-threaded into the piston 52 as at 65. The outside diameter of the joints is somewhat smaller than that of the inside of the piston extension 54 in which the joints are contained, and the two joints permit a limited amount of deviation of the gage pin 60 in any lateral direction from a vertical axis, as limited by the inside diameter of the piston extension. The lower end of the gage pin 60 is tapered as indicated at 60a, to facilitate its passage through pre-punched stock and into a gage block as hereinafter described.

Reference is now drawn to FIGS. 9–13 which illustrate one of a pair of gage block holders designated generally as 66, the gage blocks 67 of which cooperate respectively with the gage pins 60 of the two carriers 31. Here again, the construction of the two gage block holders is the same, so a description of one will suffice for both. The holders 66 are positioned on the shear bed 21 and each comprises an elongated holder body 68 which is hollow to provide guide means for sliding movement of the gage block 67 toward and away from the shear knife 22, such movement being effected by a screw-threaded shaft 69 which extends longitudinally in the holder body 68 and operatively engages the gage block, as will be apparent from FIGS. 9 and 10. At this point it may be noted that the gage block 67 contains a bushing 70 which provides an aperture for reception of the aforementioned gage pin 60, after the gage pin has passed through pre-punched stock to be sheared, as hereinafter explained.

The holder body 68 is provided at its front end portion with a downward extension 68a which abuts the front edge portion 21a of the shear bed 21, it being understood that the entire holder 66 is slidable in a transverse direction along the shear bed, that is, in parallel to the knife 22.

Figure 13:
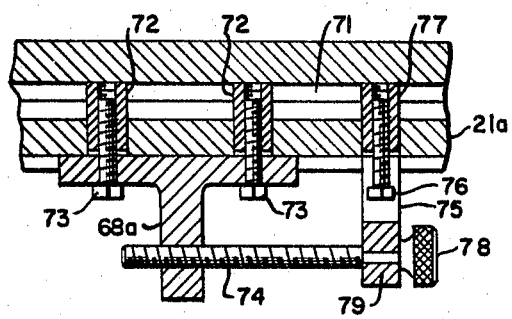
FIG. 13 is a fragmentary horizontal sectional view, taken substantially in the plane of the line 13—13 in FIG. 10.

The bed portion 21a is formed with a T-slot 71 which slidably receives a pair of T-shaped keys 72, the latter being screw-threaded for reception of a pair of locking screws 73 which extend inwardly through the holder extention 68a so that when these screws are tightened, the holder 68 may be locked in a transversely adjusted position on the bed 21. This provides a coarse adjustment of the holder transversely of the bed, and a further, fine adjustment is afforded by the provision of a screw-threaded shaft 74 which operatively engages the holder extension 68a as best shown in FIG. 13. The shaft 74 is rotatably but non-slidably journalled in a block 75 which is equipped with a locking screw 76 to engage a T-shaped key 77 in the T-slot 71 of the bed portion 21a, in a manner similar to the aforementioned keys 72. The shaft 74 is provided with a suitable knob 78 to facilitate rotation thereof, and it will be apparent that when the screw 76 is tightened and the screws 73 are loose, rotation of the shaft 74 by the knob 78 will cause the entire holder 68 to slide toward or away from the block 75 in a direction transverse of the bed 21. The rotatable but axially non-movable journal of the shaft 74 in the block 75 is indicated at 79.

Figure 10:
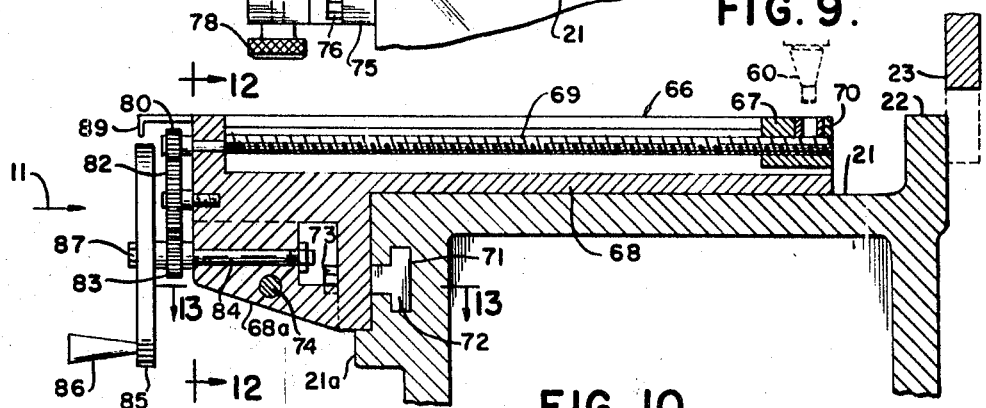
FIG. 10 is a vertical sectional view, taken substantially in the plane of the line 10—10 in FIG. 9.
Figure 11:
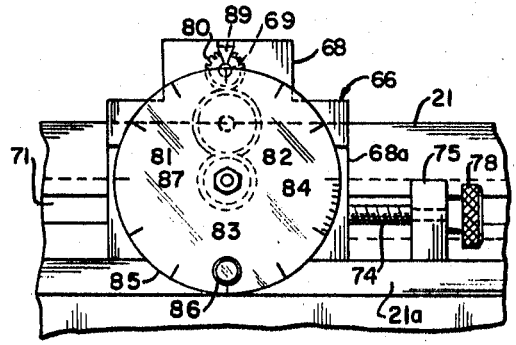
FIG. 11 is a fragmentary front elevational view taken in the direction of the arrow 11 in FIG. 10.
Figure 12:
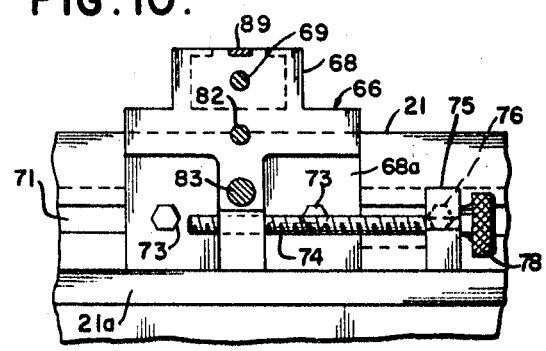
FIG. 12 is a fragmentary vertical sectional view taken substantially in the plane of the line 12—12 in FIG. 10.

Referring again to the screw shaft 69 which causes the gage block 67 to slide longitudinally in the holder 68, the shaft 69 is provided at its front end with a pinion 80 which meshes with an idler gear 81 rotatably journalled on a stub shaft or pin 82 carried by the housing extension 68a as is best shown in FIGS. 10 and 11. The gear 81 in turn meshes with a pinion 83 secured to a shaft 84 which is rotatably journalled in the extension 68a, as shown. The shaft 84 carries a hand wheel 85 provided with a hand knob 86, the wheel 85 being adjustably secured to the shaft 84 by a nut 87.

The face of the hand wheel 85 carries micrometric indicia or graduations 88 as shown by way of an example in FIG. 11, these indicia being readable with respect to a pointer 89 affixed to the holder body 68 above the hand wheel. It will be apparent from the foregoing that rotation of the hand wheel 85 will be transmitted through the gear train 80, 81, 93 to the screw shaft 69 which in turn will slide the gage block 67 along the holder 68 in one direction or the other, the adjustment of the gage block relative to the holder being determined by the indicia 88 with respect to the pointer 89. By loosening the nut 87, the position of the wheel 85 on the shaft 84 may be adjusted to facilitate initial setting of the indicia with respect to the pointer.

Figure 2:
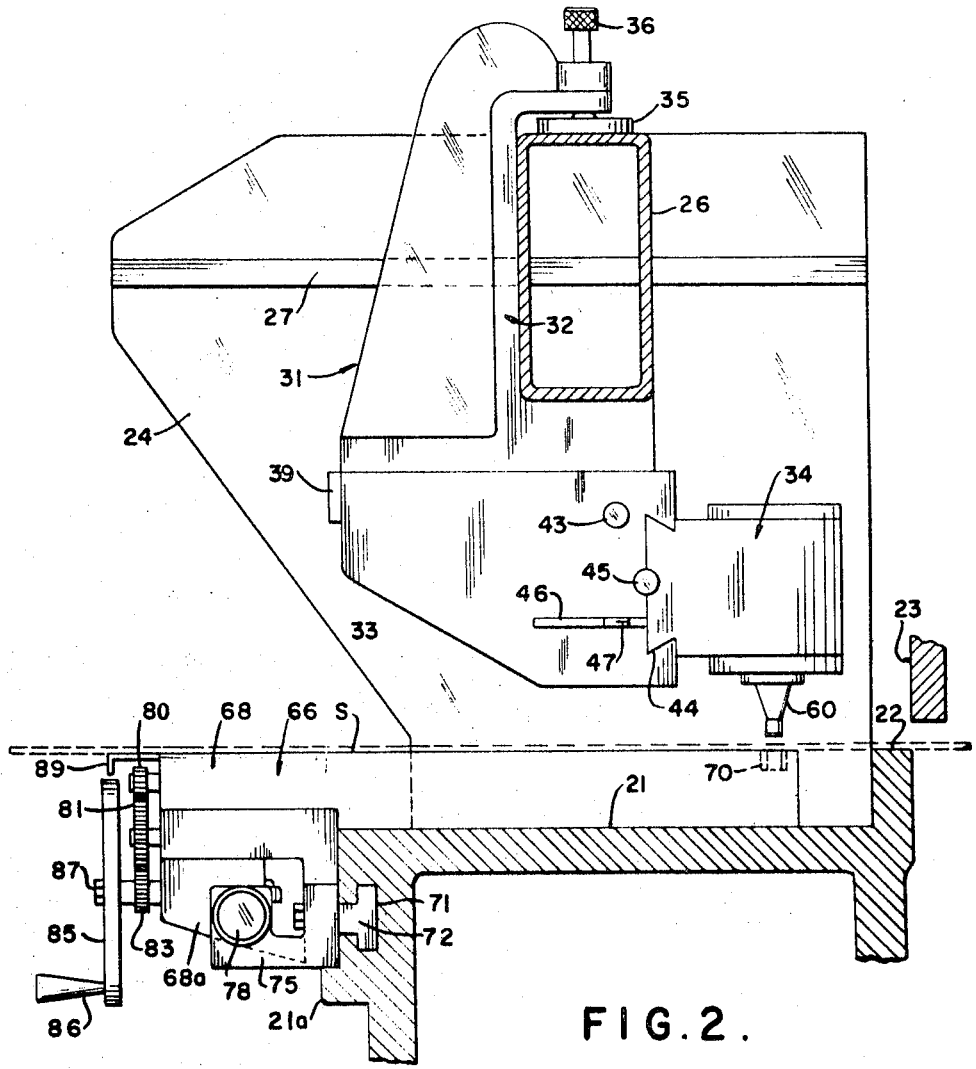
FIG. 2 is an enlarged, fragmentary sectional view, taken substantially in the plane of the line 2—2 in FIG. 1.

It will be also observed that by virtue of the gear train 80, 81, 83, it is possible to place the hand wheel 85 and the pointer 89 below the level of the upper surface of the holder body 68 so that the stock to be sheared, indicated at S in FIG. 2, may be passed freely over the holder to the knife 22.

FIG. 14 illustrates a typical sheet of stock S which has been pre-punched with series of holes 90 arranged in rows extending transversely of the sheet in spaced relation from lines 92 along which the sheet is to be transversely sheared into a plurality of individual strips S1. Each individual strip may then be sheared in a subsequent operation into a plurality of individual blanks S2, as indicated in FIG. 15. The pre-punched holes 90 in the sheet readily facilitate the shearing operations by the use of the gage of the invention, so that the holes 90 are accurately located with respect to the shear lines 92 between the strips S1 of the sheet S, and between the shear lines 93 between the blanks S2 of each strip.

In operation, the sheet S is fed into the shear 20 with one side edge of the sheet being guided by one of the guiding bars 25 and appropriate adjustments are then made in order to bring the gage pins 60 and the bushings 70 of the gage blocks 67 into register with selected of the pre-punched apertures or holes 90 in the sheet, for example, the holes 90' which have been blacked out in FIG. 14. These adjustments may be two-fold, namely, coarse and fine, and both in directions transverse of the bed 21 as well as toward and away from the knife 22, it being understood that the conventional shear usually includes a back gage (not shown) which is disposed rearwardly of the knife 22 to limit the extent to which the sheet S may be inserted into the shear.

In any event, the coarse adjustment of the gage pins 60 toward or away from the knife 22 is made simply by loosening the clamping screws 29 and sliding the support bar 26 along the rails 27 as required, after which the screws 29 are tightened. A fine adjustment of the pins 60 in the same direction is obtained by loosening the lock screws 43 and actuating the adjustment screws 38 so as to slide the portions 33 and 34 of the carriers 31 as a unit relative to the carrier portions 32 as required, after which the lock screws 43 are again tightened. A coarse adjustment of the gage pins 60 transversely of the bed 21 is made by loosening the clamp screws 36, whereupon the entire carriers 31 may be slid longitudinally along the supporting bar 26 to their coarsely adjusted positions, prior to tightening of the clamp screws 36.

Corresponding adjustments are similarly made to place the bushings 70 of the gage blocks 67 in register with the gage pins 60. In this respect, a coarse adjustment is made by loosening the lock screws 73 and 76, whereupon the entire holders 66 may be moved transversely of the bed 21 along with the shafts 74 and blocks 75 in one direction or the other. The lock screws 76 are then tightened to secure the blocks 75 in a coarsely adjusted position, the screw shafts 74 then being rotated so as to move the holders 66 transversely toward or away from the blocks 75 to a finely adjusted position, after which the lock screws 73 are tightened to lock the holders 66 in place. Adjustment of the gage blocks 67 in the holders 66 toward and away from the knife 22 is accurately effected by rotation of the graduated hand wheels 85 with respect to the pointers 89, as already explained.

After the appropriate adjustments have been made as aforesaid, the power cylinders 34a are energized so as to project the gage pins 60 downwardly through the selected apertures or holes 90′ in the sheet of stock S and into the bushings 70 of the gage blocks 67, it being noted that the universal mounting 61, 62 of the gage pins along with their tapered end portions 60a facilitates passage of the pins through the stock and into the bushings even if there should be some minor misalignment in the adjustment of the bushings and pins.

The shear may then be actuated to successively cut off the strips S1 from the sheet S along the transverse shear lines 92, the direction of travel of the stock into the shear being indicated in conjunction with both FIG. 14 and FIG. 15. After the sheet has been sheared into individual strips S1 as shown in FIG. 15, the strips themselves may be sheared into individual blanks S2 along transverse shear lines 93, by feeding the same into the machine in the same manner as the original sheet of stock. In shearing the individual strips S1, only one of the gage pins and gage blocks at one side of the machine need be used, as for example in a single locating hole indicated at 90″.

While in the foregoing there has been described and shown the preferred embodiment of the invention, various modifications may be apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a shear having a bed and a knife, a gage comprising in combination a transverse supporting bar mounted above said bed, a carrier supported on said bar above the bed, a downwardly projectable and upwardly retractable gage pin depending from said carrier, said carrier being adjustable transversely of said bed and toward and away from said knife whereby to locate said gage pin accordingly, means for projecting and retracting said gage pin, and a gage block adjustably positioned on said bed, said gage block being provided with an aperture receiving the projected gage pin therein.

2. The device as defined in claim 1 wherein said carrier is adjustable toward and away from said knife by coarse adjusting means comprising means at the ends of said supporting bar mounting said bar for movement toward and away from said knife, and means for clamping the bar in an adjusted position on said mounting means.

3. The device as defined in claim 1 wherein said carrier is adjustable transversely of said bed by coarse adjusting means afforded by movement of the carrier longitudinally of said supporting bar, said coarse adjusting means including means for clamping the carrier in an adjusted position on said bar.

4. The device as defined in claim 1 wherein said carrier is adjustable toward and away from said knife by fine adjusting means comprising a relatively fixed carrier member, another carrier member slidable relative to the fixed member toward and away from the knife, and screw-threaded means for sliding said slidable member.

5. The device as defined in claim 4 wherein said fine adjusting means also includes means for releasably locking said slidable member in an adjusted position relative to the fixed member.

6. The device as defined in claim 1 wherein said carrier is adjustable transversely of said bed by fine adjusting means comprising a relatively fixed carrier member, another carrier member slidable relative to the fixed member transversely of the bed, and screw-threaded means for sliding said slidable member.

7. The device as defined in claim 6 wherein said fine adjusting means also includes means for releasably locking said slidable member in an adjusted position relative to the fixed member.

8. The device as defined in claim 1 together with means mounting said gage pin in said carrier for limited universal movement in deviation from a vertical axis.

9. The device as defined in claim 1 wherein said means for projecting and retracting said gage pin include a double-acting fluid operator supported by said carrier, said fluid operator having a vertically reciprocable piston operatively connected to the gage pin.

10. The device as defined in claim 1 together with means adjustably positioning said gage block on said bed, said last mentioned means comprising a holder positioned on the bed and elongated in the direction of said knife, said gage block being slidable longitudinally in said holder, and screw-threaded means for sliding the block in the holder.

11. The device as defined in claim 10 wherein said holder is slidable transversely of said bed, and means for releasably locking the holder in an adjusted position relative to the bed.

12. The device as defined in claim 11 together with screw-threaded means for sliding said holder relative to said bed.

References Cited
UNITED STATES PATENTS

| | | | |
|---|---|---|---|
| 3,043,586 | 7/1962 | Boule | 269—49 |
| 3,080,512 | 3/1963 | Cubbidge et al. | 83—451 X |
| 3,314,322 | 4/1967 | Cutter | 83—33 |

JAMES M. MEISTER, Primary Examiner

U.S. Cl. X.R.

269—49